Patented Dec. 8, 1953

2,662,069

UNITED STATES PATENT OFFICE 2,662,069

LINEAR POLYESTER RESINS

Peter Kass, Wilmington, Del., assignor to Atlas Powder Company, Wilmington, Del., a corporation of Delaware No Drawing. Application October 14, 1950, Serial No. 190,239

15 Claims. (Cl. 260—45.4)

This invention relates to polyester resins and more particularly to thermoplastic pulverulent polyester resins which are curable and which may be copolymerized with other polymerizable bodies.

In my copending application Serial No. 92,746 filed May 11, 1949, I have disclosed a class of new and useful resins which are thermoplastic, high melting solids, sufficiently hard and friable at room temperature that they may be pulverized and stored without blocking, autopolymerizable under the influence of known curing catalysts and copolymerizable with styrene or other vinyl compounds to yield valuable laminating and casting resins. The so described resins are basically polyesterification products of ethene dicarboxylic acids and dihydric alcohols conforming to the formula

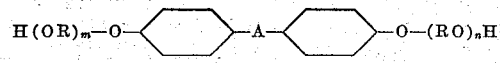

wherein R is an alkylene radical containing from 2 to 3 carbon atoms, A is a 2-alkylidene radical containing from 3 to 4 carbon atoms, $m$ and $n$ are each at least one, and the average sum of $m$ and $n$ is not over 3.

Now I have found that resins may be prepared which retain the advantageous properties of my previously disclosed polyester resins and exhibit, in addition, improved characteristics, especially in regard to resistance of the cured resin to distortion under heat, this advantage appearing both in the autopolymerizates and in copolymers of said resins with other polymerizable bodies such as styrene and diallyl phthalate.

It is, therefore, an object of this invention to provide high melting, curable, linear polyester resins of high resistance to heat distortion.

It is a further object to provide high melting, linear polyester resins which are compatible with and readily copolymerizable with styrene or other polymerizable monomer to yield heat resistant copolymers.

The above and other objects will become more apparent from the following description of the invention and the appended claims.

I accomplish the above objects by providing a polyesterification product of an ethene dicarboxylic acid and a mixed diol consisting of a major proportion of a diol conforming to the formula

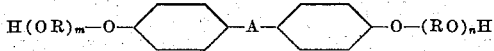

wherein the symbols have the meanings hereinbefore ascribed to them and a minor proportion of a lower alkylene glycol.

The said ethene dicarboxylic acids are fumaric acid and maleic acid, and the polyester resins of my present invention may be esters of either of these acids or a mixture of the two. Throughout this specification and in the appended claims the term dicarboxylic acids is to be understood to include anhydrides of such acids where such anhydrides exist, and derivatives of such acids which yield dicarboxylic acid radicals under esterification conditions. For example, lower alkyl esters of the dicarboxylic acids are full equivalents of the acids themselves for purposes of this application.

Diols conforming to the formula cited above and useful as the major component of the diols employed in preparing the improved resins of the present invention are fully described in my above mentioned copending application, wherein methods for their preparation are also indicated. Among such diols I may mention specifically 2.2 di-(4-beta hydroxyethoxy phenyl)-propane, 2.2 di-(4-hydroxy propoxy phenyl)-butane, the polyoxyethylene ether of 2-butylidene diphenol wherein both phenolic hydroxyls are oxyethylated and the average number of oxyethylene groups per mol is 2.6, the polyoxypropylene ether of isopropylidene diphenol wherein both phenolic hydroxyls are oxypropylated and the average number of oxypropylene groups per mol is 2.5, and the like.

The minor component of the mixed diols useful in preparing my improved linear polyester resins is a lower alkylene glycol, preferred members of which are selected from the group consisting of ethylene glycol, diethylene glycol, propylene glycol and dipropylene glycol. Mixtures of the said glycols may equally be employed. As the proportion of said glycol increases in the mixture the tendency is for the resulting resins to have lower melting points and to be less amenable to grinding and storage without blocking. Useful resins within the purview of the invention are obtained, however, when as much as 50 mol per cent of the mixed diol is the said lower glycol. When as little as 10 mol per cent of the reacting diol is a lower glycol the resins are significantly improved over comparable resins containing no glycol with respect to the sought for properties of improved resistance to heat distortion of cured polymers and copolymers thereof. To enhance these desirable properties I generally prefer to employ diol mixtures containing from about 20 to about 50 mol per cent of the said lower glycol.

The polyester resins of my invention may be made from the above named components by esterification techniques well known in the art.

Preferably I charge substantially stoichiometrically equivalent quantities of the dicarboxylic acid and the mixed diol into a reaction vessel provided with means for agitation, means for maintaining an inert atmosphere in the vessel and means for applying vacuum. The reactants are heated together under agitation and in an inert atmosphere, first at moderate temperatures and at substantially atmospheric pressure to minimize loss of the more volatile components by distillation, and finally more strongly and under reduced pressure to drive the polyesterification to the desired extent. The melting point of the resin resulting from polyesterification of any given mixed diol-dicarboxylic acid system in accordance with the invention rises progressively as the degree of esterification proceeds. In order that the resulting product shall be hard and friable, I carry the esterification forward until its melting point by the ASTM Ball and Ring Method is at least 80° C., and preferably until its melting point is at least 90° C. Linear polyesters of these high melting points are readily obtained without carrying the reaction to the stage corresponding to super polyesters of the fiber forming type.

I may, in certain cases employ known esterification catalysts to hasten the esterification although I generally prefer to carry out the reaction in the absence of such catalyst to avoid contamination of the final resin with catalyst residue. Preferably, though not necessarily, I incorporate in the reaction mixture a small proportion, say from 0.01% to 1% by weight, of a polymerization inhibitor such, for example, as hydroquinone, pyrogallol, or the like, to minimize double bond polymerization during esterification.

The polyesters so formed have acid numbers ranging downward from 30, and like the polyesters of my hereinbefore mentioned copending application are hard and pulverulent at ordinary temperatures; autopolymerizable when heated in the presence of known curing catalysts; miscible over a wide range of concentrations with low molecular weight aromatic solvents, and copolymerizable with vinyl monomers. They are differentiated from the resins of my prior invention in that they yield cured copolymers with other polymerizable materials, and cured autopolymers, of unusually high resistance to heat distortion.

In the following illustrative examples preparative details of formation of resins in accordance with my invention are presented.

EXAMPLE I

A mixture of 582.6 g. of 2.2 di-(4-hydroxy propoxy phenyl) propane, 106.6 g. of ethylene glycol, 380.0 g. fumaric acid and 0.85 g. of hydroquinone were heated together in a reaction vessel provided with continuous agitation and means of sweeping a current of inert gas through and over the charge. The ingredients were heated together at 185-190° C. for ¾ hour and at 215-220° C. for an additional 1¾ hour and at 235-240° C. for an additional hour. A vacuum of 50-55 mm. of mercury was then applied and the reaction continued at 215-220° C. for about 15 minutes. The resulting product was a hard, friable, clear, tan-colored resin with a melting point (ASTM Ball and Ring Method) of 104° C. and an acid number of 21.

EXAMPLE II 638 grams of fumaric acid, 1335 grams of 2.2 di-(4-beta hydroxyethoxy phenyl) propane, 92 grams of ethylene glycol and one gram of hydroquinone were charged into a reaction vessel, provided with continuous agitation and means for sweeping a current of inert gas through and over the charge. The mixture was reacted for 15.5 hours, the temperature being brought up from 150° to 185° C. during the first four hours, held at 185° C. for the next 5 hours, and finally held at 185° C. under vacuum (pressure=7 millimeters of mercury) for 6.5 hours. The resulting product was a hard, friable, clear, tan-colored resin with a melting point of 100° C. and an acid number of 20.

EXAMPLE III 800 grams of 2.2 di-(4-hydroxy propoxy phenyl) propane, 404 grams of fumaric acid and 0.6 gram of hydroquinone were heated in an agitated reaction vessel in a current of inert gas at 185° C. for 8.75 hours. 93 grams of propylene glycol was then added and the reaction continued in an inert atmosphere for 5.25 hours at 175° C. Vacuum was then applied and the temperature taken to 200° C. for 3.75 hours, the pressure being 10 millimeters of mercury. There resulted from this process a clear, tan-colored resin, hard and friable at room temperature with a melting point of 107° C.

The products of any of the above heated to curing temperatures with known curing catalysts, such for example at 200° C. for 2 minutes with 2% of benzoyl peroxide intimately dispersed in the resin, are converted to insoluble infusible resinous materials showing remarkably high resistance to distortion under the influence of heat and pressure.

The incorporation of additional reactants in minor proportions to modify the properties of the resins does not depart from the spirit of the invention provided the polyester consists essentially of the reaction product of an ethene dicarboxylic acid and the mixed diol hereinbefore described. Thus minor proportions of the ethene dicarboxylic acid may be replaced by other dicarboxylic acids or by mono carboxylic acids. Or, minor proportions of the alcohol component may be replaced by other polyhydric or monohydric alcohols. By way of illustration, a useful laminating resin, producing low viscosity solutions in styrene is prepared by replacing part of the diol by the monohydric beta phenoxyethanol according to the following example.

EXAMPLE IV

The following amounts of material were charged into a 5 l. flask equipped with stirrer and $CO_2$ inlet—2490 g. 2.2 di-(4-hydroxy propoxy phenyl)-propane, 124.2 g. ethylene glycol, 1160 g. fumaric acid, 284 g. beta phenoxy ethanol and 0.6 g. hydroquinone. The mixture was reacted at 185-190° C. for 1.5 hours, at which time the temperature was raised to 215-220° C. and the reaction continued for a total of 3 hours; the temperature was then raised to 235-240° C. and the reaction continued for a total of 7.5 hours. A vacuum of 10 mm. pressure was then applied to the reaction vessel, the temperature was allowed to drop to 220° C. and esterification was continued for 2 hours at 215-220° C. under vacuum. The product resulting from the reaction was a hard brittle, amber-colored resin with a M. P. (Ball and Ring) of 90° C.

The modified polyester resins of the present invention are particularly useful in molding powders where they may be incorporated with inert fillers and other polymerizable components, such for example, as diallyl phthalate and subjected to heat and pressure to yield molded articles of high strength and of excellent resistance to heat distortion. Illustrating the copolymerization of a resin made in accordance with the present invention with diallyl phthalate in the molding of a plastic disk is the following:

EXAMPLE V

A molding compound was made by milling together on a two roll mill heated to about 200° F. the following ingredients: 400 g. of the product obtained in Example I, 174 g. diallyl phthalate, 687 g. ground silica filler (Novacite 325 mesh), 212 g. titanium oxide pigment (Titanox RC), 400 g. chopped glass strands 7/16", 11.4 g. zinc stearate and 23 g. tert-butyl perbenzoate. 17-gram portions of the resulting putty-like material were compression molded into disks under 500 p. s. i. pressure, at 350° F. for a time of 30 seconds. The molded disks had good impact strength, good resistance to heat distortion and excellent electrical properties.

Other copolymers employing the novel polyesters herein disclosed include the resinous product comprising the copolymerization product of from 90% to 10% of a polymerizable vinyl compound, and from 10% to 90% of the resinous esterification product, having a melting point of at least 90° C., of 1,2 dicarboxy ethene with a substantially stoichiometrically equivalent quantity of a mixed diol consisting of from about 50 to about 90 mol percent of a diol conforming to the formula hereinbefore defined, and from about 50 to about 10 mol percent of a glycol selected from the group consisting of ethylene, diethylene, propylene and dipropylene glycols. Particular among such copolymers are those wherein the said vinyl monomer is styrene and wherein the said resinous esterification product is that from a mixed diol consisting of from 50 to 80 mol percent of 2,2 di-(4 beta hydroxy ethoxy phenyl)-propane, and from about 50 to about 20 mol percent of ethylene glycol. Also, there may be named the copolymerization product of from 15% to 45% of diallyl phthalate with from 85% to 15% of the last said resinous esterification product.

What is claimed is:

1. A thermoplastic, curable resinous esterification product of 1,2-dicarboxy ethene with a substantially stoichiometrically equivalent amount of a mixed diol consisting of from about 50 to about 90 mol per cent of a diol conforming to the formula

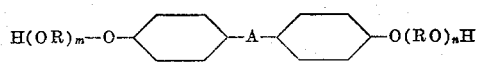

wherein R represents an alkylene radical of from 2 to 3 carbon atoms, A represents a 2-alkylidene radical of from 3 to 4 carbon atoms, $m$ and $n$ are each at least one and the average sum of $m$ and $n$ is not over 3; and from about 50 to about 10 mol per cent of a lower alkylene glycol; said product having a melting point of at least 80° C.

2. A thermoplastic, curable resinous esterification product of 1,2-dicarboxy ethene with a substantially stoichiometrically equivalent quantity of a mixed diol consisting of from about 50 to about 90 mol per cent of a diol conforming to the formula

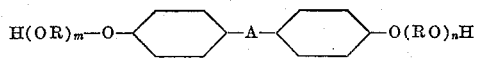

wherein R represents an alkylene radical of from 2 to 3 carbon atoms, A represents a 2-alkylidene radical of from 3 to 4 carbon atoms, $m$ and $n$ are each at least one and the average sum of $m$ and $n$ is not over 3; and from about 50 to about 10 mol per cent of a lower alkylene glycol selected from the group consisting of ethylene glycol, diethylene glycol, propylene glycol and dipropylene glycol; said product having a melting point of at least 90° C.

3. A thermoplastic, curable, resinous esterification product of 1,2-dicarboxy ethene with a substantially stoichiometrically equivalent quantity of a mixed diol consisting of from about 50 to about 80 mol per cent of a diol conforming to the formula

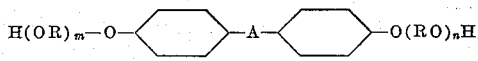

wherein R represents an alkylene radical of from 2 to 3 carbon atoms, A represents a 2-alkylidene radical of from 3 to 4 carbon atoms, $m$ and $n$ are each at least one, and the average sum of $m$ and $n$ is not over 3; and from about 50 to about 20 mol per cent of a lower alkylene glycol selected from the group consisting of ethylene glycol, diethylene glycol, propylene glycol and dipropylene glycol; said product having a melting point of at least 90° C.

4. A thermoplastic, curable, resinous esterification product of 1,2-dicarboxy ethene with a substantially stoichiometrically equivalent quantity of a mixed diol consisting of from about 50 to about 80 mol per cent of a diol conforming to the formula

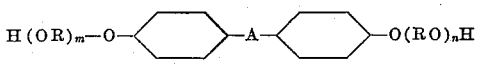

wherein R represents an alkylene radical of from 2 to 3 carbon atoms, A represents a 2-alkylidene radical of from 3 to 4 carbon atoms, $m$ and $n$ are each at least one, and the average sum of $m$ and $n$ is not over 3; and from about 50 to about 20 mol per cent of ethylene glycol; said product having a melting point of at least 90° C.

5. A thermoplastic, curable, resinous esterification product of 1,2-dicarboxy ethene with a substantially stoichiometrically equivalent quantity of a mixed diol consisting of from about 50 to 80 mol per cent of 2.2 di-(4 beta hydroxy ethoxy phenyl)-propane and from about 50 to about 20 mol per cent of ethylene glycol; said product having a melting point of at least 90° C.

6. A thermoplastic, curable, resinous esterification product of fumaric acid with a substantially stoichiometric quantity of a mixed diol consisting of 75 mol per cent of 2.2 di-(4-beta hydroxyethoxy phenyl)-propane and 25 mol per cent of ethylene glycol; said product having a melting point of at least 90° C.

7. A thermoplastic, curable, resinous esterification product of fumaric acid with a substantially stoichiometric quantity of a mixed diol consisting of 50 mol per cent of 2.2 di-(4 hydroxy propoxy phenyl)-propane and 50 mol per cent of ethylene glycol, said product having a melting point of at least 90° C.

8. A thermoplastic, curable, resinous esterification product of one molar proportion of fumaric acid with a mixture of dihydric and monohydric alcohols consisting of 0.7 molar proportion of 2.2 di-(4 hydroxy propoxy phenyl)-propane, 0.2 molar proportion of ethylene glycol, and 0.2 molar proportion of beta phenoxyethanol; said product having a melting point of at least 90° C.

9. The insoluble, infusible resinous product obtained by heating the product of claim 2 under curing conditions.

10. The insoluble, infusible, resinous product obtained by heating the product of claim 5 under curing conditions.

11. The insoluble, infusible resinous product obtained by heating the product of claim 7 under curing conditions.

12. The resinous product comprising the copolymerization product of from 90% to 10% of a polymerizable vinyl compound and from 10% to 90% of the product of claim 2.

13. The resinous product comprising the copolymerization product of from 90% to 10% of styrene and from 10% to 90% of the product of claim 5.

14. The resinous product comprising the copolymerization product of from 15% to 45% of diallyl phthalate and from 85% to 55% of the product of claim 5.

15. A thermoplastic, curable, resinous esterification product of 1,2-dicarboxyethene with a substantially stoichiometrically equivalent quantity of a mixed diol consisting of from about 50 to 80 mol percent of 2.2 di-(4 hydroxy propoxy phenyl)-propane and from about 50 to 20 mol percent of ethylene glycol; said product having a melting point of at least 90° C.

PETER KASS.

References Cited in the file of this patent

UNITED STATES PATENTS

| Number | Name | Date |
| --- | --- | --- |
| 2,437,046 | Rothrock et al. | Mar. 2, 1948 |